United States Patent
Ge et al.

(10) Patent No.: US 9,047,048 B2
(45) Date of Patent: Jun. 2, 2015

(54) ROTATING MECHANISM FOR ELECTRONIC DEVICE

(75) Inventors: Hai-Qian Ge, Shenzhen (CN); Che-Yu Chou, New Taipei (TW); Qun Huang, Shenzhen (CN); Tai-Shan Zhu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 102 days.

(21) Appl. No.: 13/441,846

(22) Filed: Apr. 7, 2012

(65) Prior Publication Data

US 2013/0105191 A1    May 2, 2013

(30) Foreign Application Priority Data

Oct. 27, 2011    (CN) .......................... 2011 1 0331454

(51) Int. Cl.
  *H05K 7/00*    (2006.01)
  *G06F 1/16*    (2006.01)
  *H04M 1/02*    (2006.01)

(52) U.S. Cl.
  CPC ............ *G06F 1/1616* (2013.01); *G06F 1/1681* (2013.01); *H04M 1/0212* (2013.01)

(58) Field of Classification Search
  CPC ... G06F 1/1637; G06F 1/1616; G06F 1/1656; G06F 1/1626; G06F 1/203; G06F 1/1681; G06F 1/1622; H04M 1/0216; H04M 1/0233
  USPC .............. 361/679.26–679.3, 679.55–679.56; 455/575.1, 575.3
  See application file for complete search history.

(56) References Cited

U.S. PATENT DOCUMENTS

| | | | | |
|---|---|---|---|---|
| 5,881,150 | A | * | 3/1999 | Persson .................... 379/433.13 |
| 7,071,916 | B2 | * | 7/2006 | Duarte et al. ................ 345/156 |
| 7,924,554 | B2 | * | 4/2011 | Shen ....................... 361/679.21 |
| 8,396,520 | B2 | * | 3/2013 | Jung .......................... 455/575.4 |
| 8,503,174 | B2 | * | 8/2013 | Fyke ....................... 361/679.55 |
| 2005/0102799 | A1 | * | 5/2005 | Huang ........................... 16/367 |
| 2006/0288534 | A1 | * | 12/2006 | Lu .................................. 16/334 |
| 2008/0172831 | A1 | * | 7/2008 | Liu ................................ 16/221 |
| 2011/0309728 | A1 | * | 12/2011 | Diebel ....................... 312/293.1 |

FOREIGN PATENT DOCUMENTS

CN           101661309 A    *    3/2010

* cited by examiner

*Primary Examiner* — Hung S Bui
*Assistant Examiner* — James Wu
(74) *Attorney, Agent, or Firm* — Novak Druce Connolly Bove + Quigg LLP (57) ABSTRACT

An electronic device comprises a first portion, a second portion, and a rotating mechanism. The first portion covers on the second portion. The rotating mechanism is disposed in the second portion and is used for rotatably connecting the first portion and the second portion. The first portion is rotatable relative to the second portion from a first position to a second position by rotating the first portion relative to the rotating mechanism in a first plane. In the first position, the first position covers on the second portion. In the second position, a part of the second portion is exposed, and the angle between the first portion and the second portion is adjustable by rotating the first portion in a second plane perpendicular to the first plane.

14 Claims, 8 Drawing Sheets

ROTATING MECHANISM FOR ELECTRONIC DEVICE

BACKGROUND

1. Technical Field

The present disclosure relates to electronic devices.

2. Description of Related Art

Electronic devices, such as slider phones include a main body and a display segment covering the main body. The main body can be exposed by sliding the display panel or the main body in a predetermined direction. However, most of sliding electronic devices can only slide in one predetermined direction.

Therefore, there is room for improvement in the art.

BRIEF DESCRIPTION OF THE FIGURE

The components of the drawings are not necessarily drawn to scale, the emphasis instead being placed upon clearly illustrating the principles of the embodiment of an electronic device. Moreover, in the drawings, like reference numerals designate corresponding parts throughout several views.

DETAILED DESCRIPTION

Embodiments of the present disclosure will now be described in detail with reference to the drawings.

Figure 1:
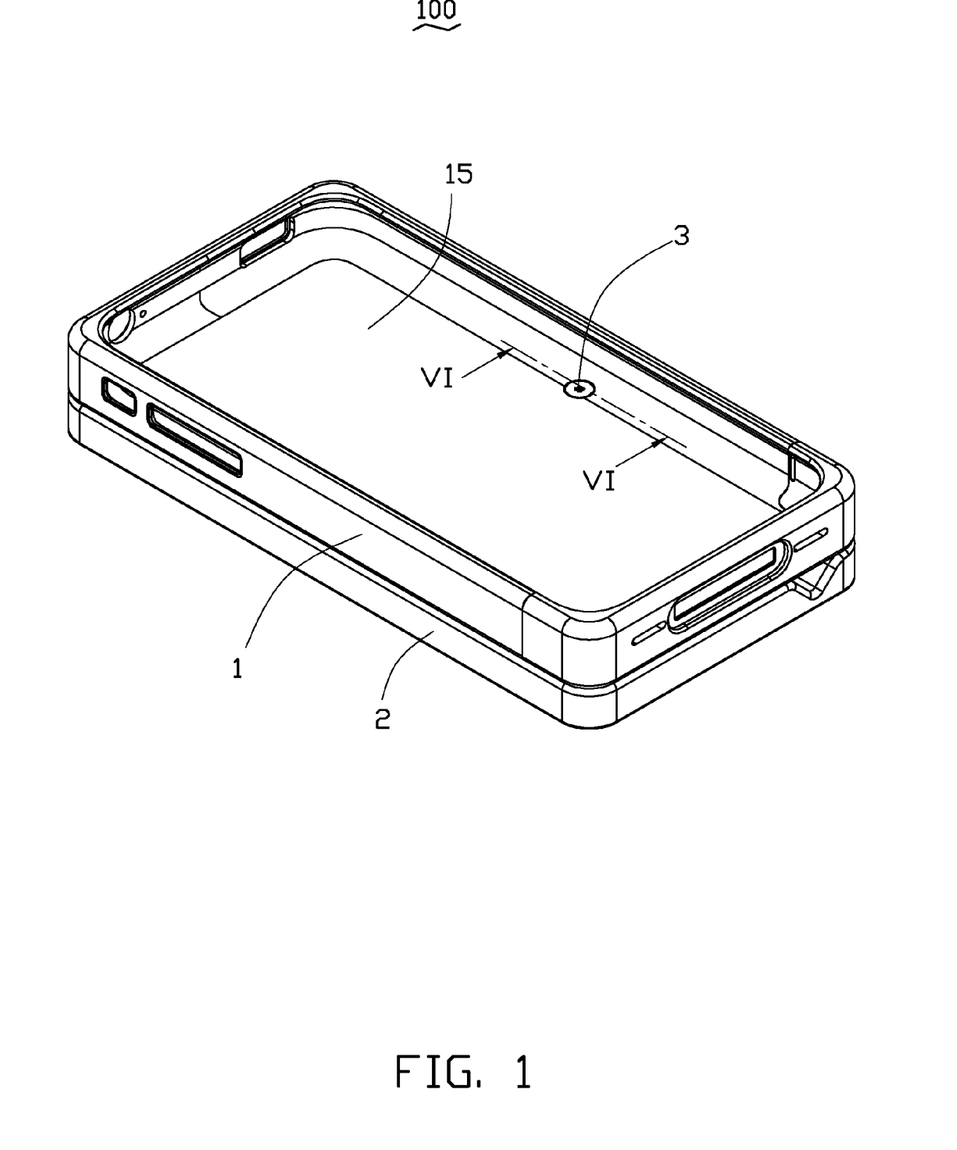
FIG. 1 is a schematic view of an electronic device, according to an exemplary embodiment.

FIG. 1, shows an electronic device 100 including a first portion 1, a second portion 2, and a rotating mechanism 3. The first portion 1 is rotatable relative to the second portion 2 and forms an angle with the second portion 2. The rotating mechanism 3 is used for rotatably connecting the first portion 1 with the second portion 2. In the embodiment, the first portion 1 is a shell and is used for housing another device, such as mobile phone, or personal digital assistant (PDA), for example. The second portion 2 is a keyboard and communicates with the device received in the first portion 1 in a wireless or wired manner.

Figure 2:
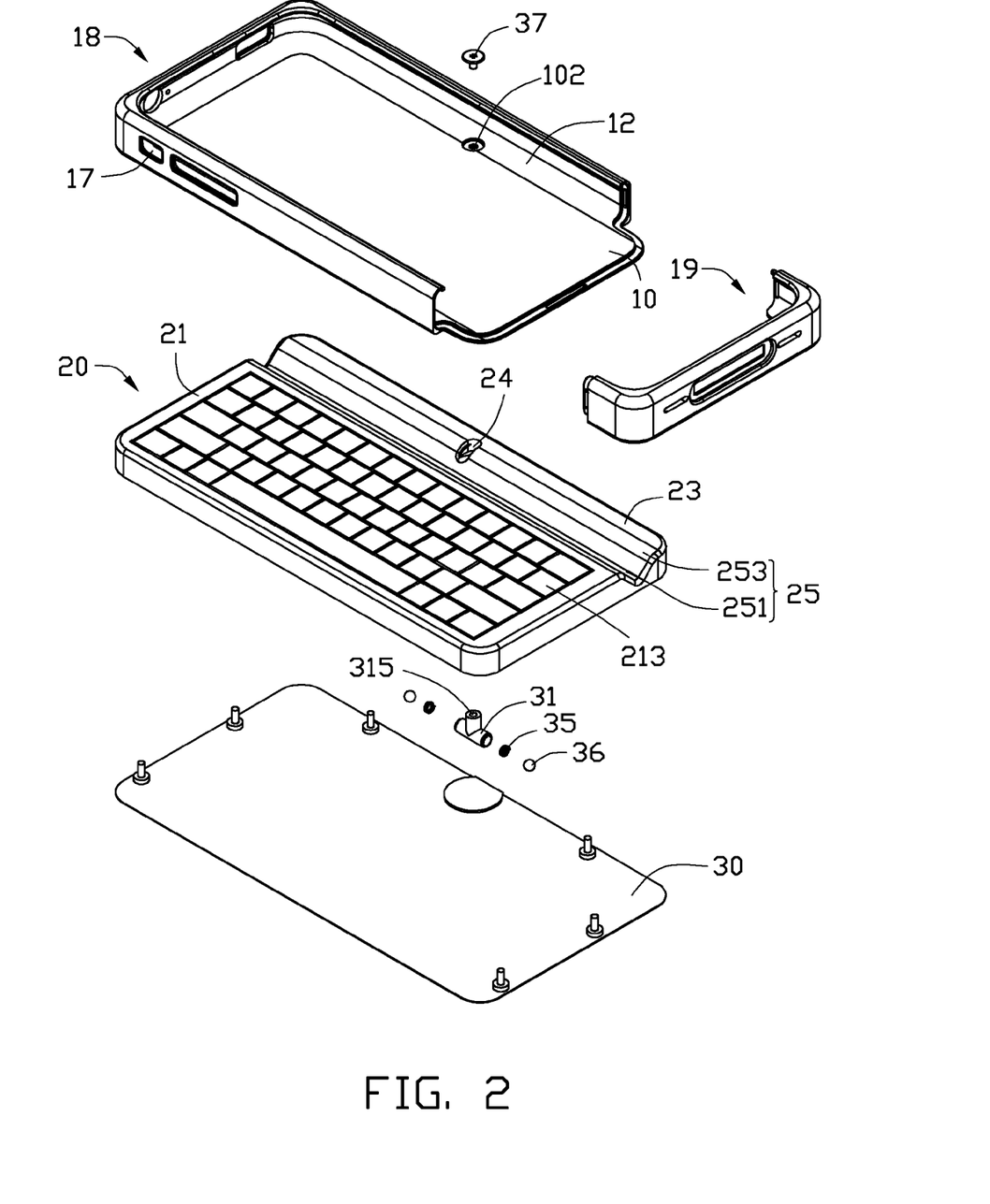
FIG. 2 is an exploded view of the electronic device of FIG. 1.

Referring to FIG. 2, the first portion 1 is substantially rectangular, and includes a bottom wall 10 and four side walls 12 extending from a rim of the bottom wall 10. The bottom wall 10 defines a fixing hole 102. The fixing hole 102 is arranged adjacent to one of the longitudinal side walls 12. The side walls 12 include a plurality of first openings 17. The bottom wall 10 and the side walls 12 form a receiving portion 15. The receiving portion 15 is used for housing another device with a display panel facing opposite to the bottom wall 10. In the embodiment, the first portion 1 divides into a first shell 18 and a second shell 19 detachably sleeves on the first shell 18. In the other embodiment, the first portion 1 further includes an upper transparent wall (not shown) opposite to the bottom wall 10.

The second portion 2 is substantially rectangular and includes a main body 20 and a bottom plate 30 mounted on the bottom of the main body 20. The main body 20 includes a keyboard portion 21 and a supporting portion 23. The keyboard portion 21 includes a plurality of keys 213.

The top surface of the main body 20 opposite to the bottom plate 30 defines a substantially V shaped slot 25 between the keyboard portion 21 and the supporting portion 23 extending in a direction parallel to the supporting portion 23. The slot 25 includes a first sloping surface 251 connected to the keyboard portion 21 and a second sloping surface 253 connected to the supporting portion 23. The sloping angle between the first sloping surface 251 and the surface of the keyboard portion 21 is smaller than the sloping angle between the second sloping surface 253 and the surface of the supporting portion 23. In the embodiment, the second portion 2 communicates with another device received in the first portion 1 in a wireless manner.

Figure 3:
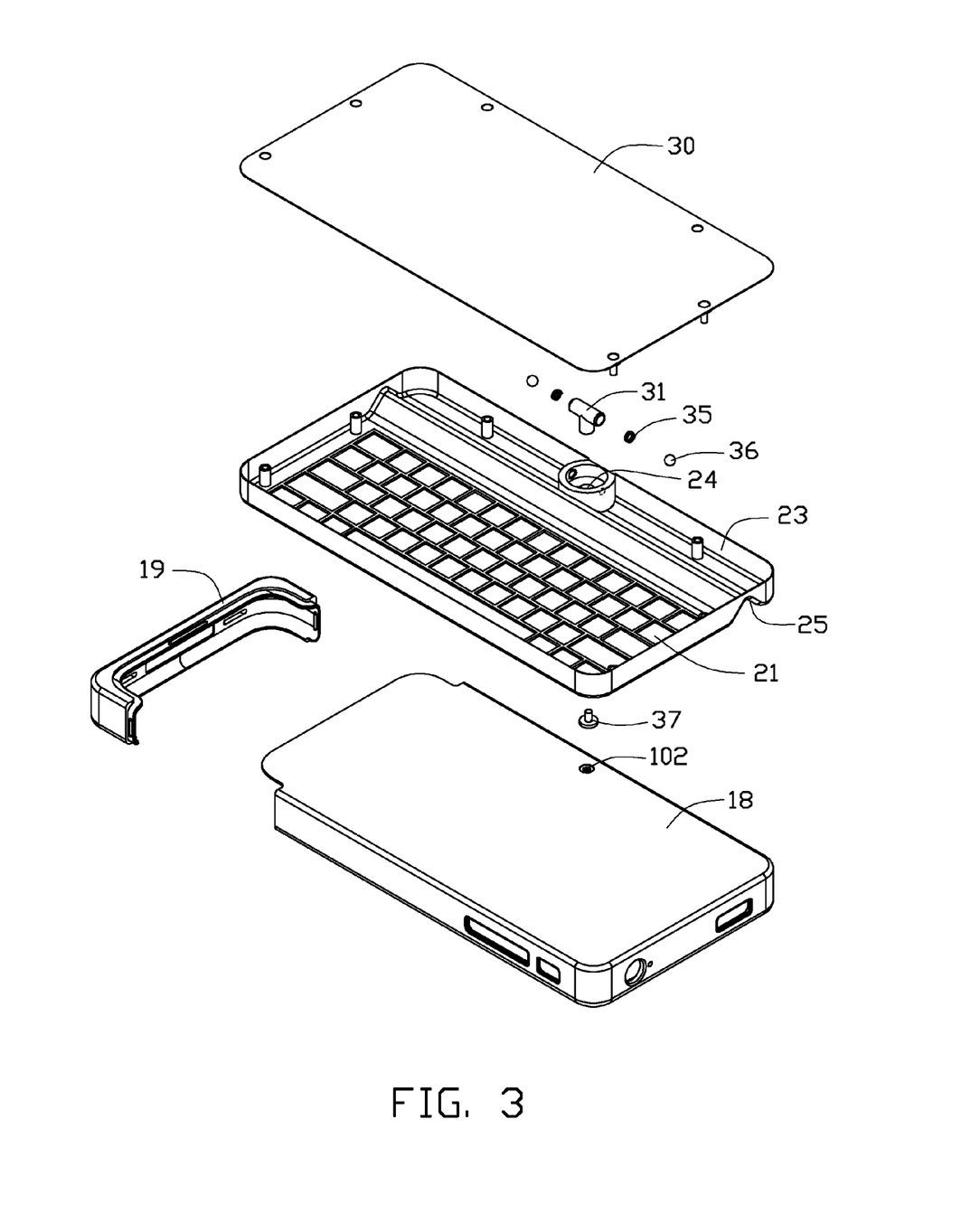
FIG. 3 is similar to FIG. 2, but viewed from another aspect.
Figure 4:
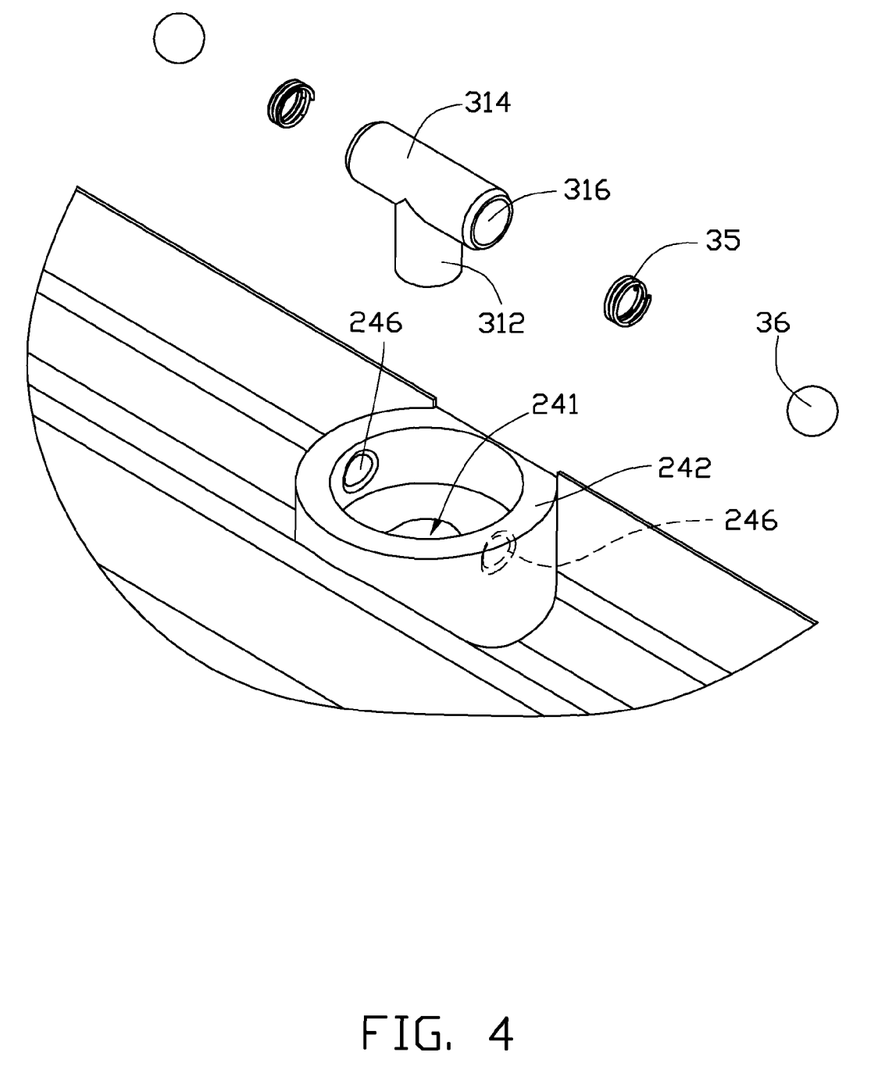
FIG. 4 is a partially enlarged view of the electronic device of FIG. 3.
Figure 5:
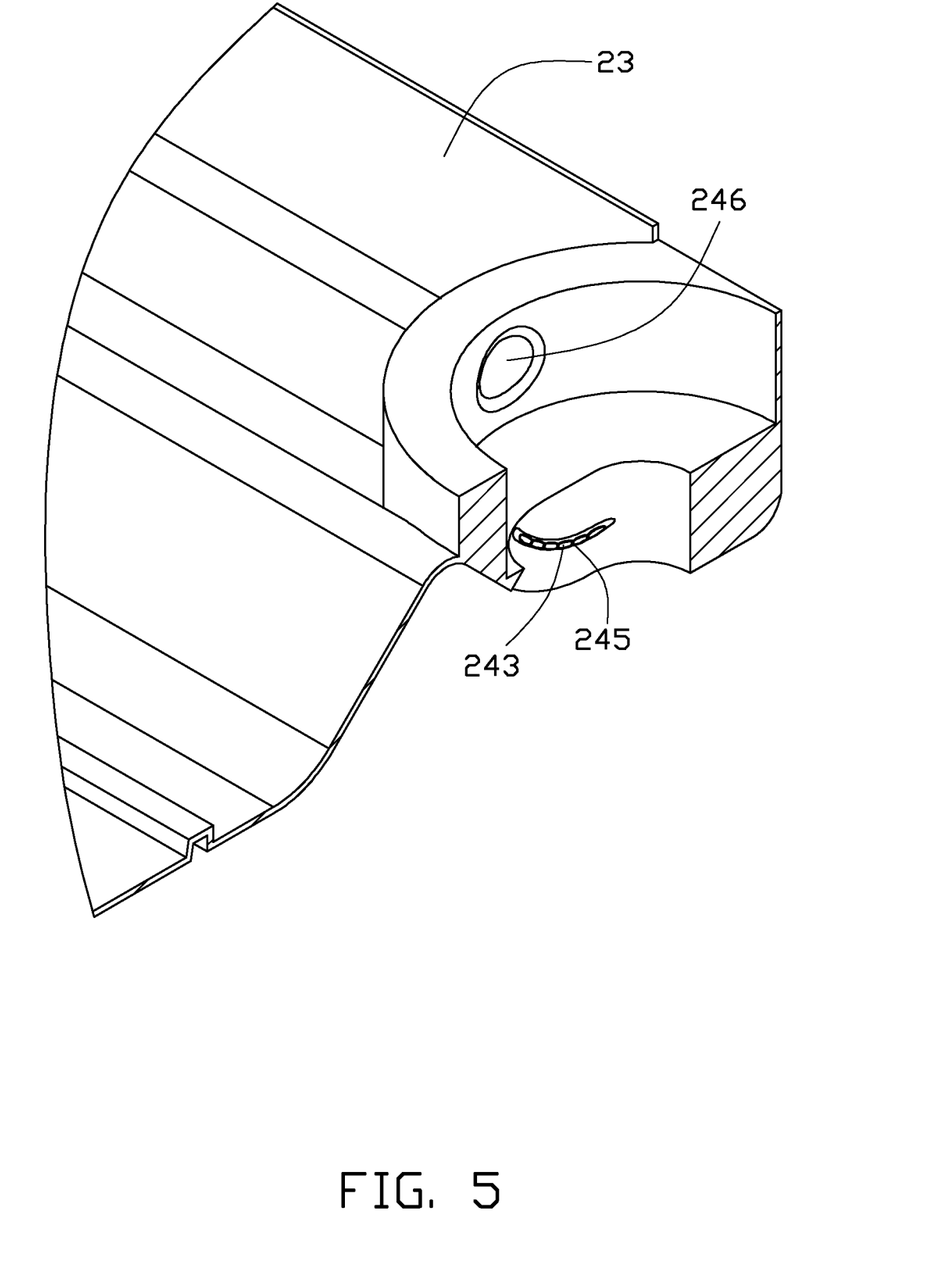
FIG. 5 is a partial, cross section view of the main body of FIG. 4.

Further referring to FIGS. 3-5, the supporting portion 23 defines a through stepped hole 24 corresponding to the fixing hole 102. The through stepped hole 24 is concaved from the second sloping surface 253 and includes a positioning portion 241 and a limiting portion 242 communicating with the positioning portion 241. The positioning portion 241 is substantially elliptical and extends the width of the main body 20. Two locking portions 243 protrude from the opposite inner sides of the positioning portion 241 along the direction of the major axis. The locking portions 243 are substantially arcuate and parallel with each other. Each locking portion 243 defines a plurality of locking grooves 245. The locking grooves 245 are evenly spaced apart from each other. In the other embodiments, only one locking portion 243 is set in one of the inner sides of the positioning portion 241.

The limiting portion 242 is substantially annular and has an axis perpendicular to the second portion 2. The diameter of the limiting portion 242 is larger than the minor axis of the positioning portion 241. Two opposite sides of the limiting portion 242 define two limiting grooves 246. The limiting groove 246 is substantially hemispherical and extends elongated with the main body 20. In the other embodiments, the limiting portion 242 can define more than one pair of limiting grooves 246.

The rotating mechanism 3 includes a pivot 31, two elastic members 35, two rotating members 36, and a fixing portion 37.

The pivot 31 is substantially T shape, and includes a first pivot body 312 and a second pivot body 314 perpendicular to the first pivot body 312. The first pivot body 312 is substantially cylindrical and defines a blind hole 315 extending in an axial direction. The first pivot body 312 may be inserted into the positioning portion 241 and received in one of the locking grooves 245 to be positioned. The second pivot body 314 is rotatably received in the limiting portion 242. The diameter of the first pivot body 312 is slightly less than the locking groove 246, so the first pivot body 312 is rotatably received in the positing holes 241. Opposite sides of the second pivot body 314 define two receiving grooves 316. The receiving grooves 316 extend in axial direction of the second pivot body 314. The diameter of the receiving groove 316 is slightly larger than that of the elastic member 35 and rotating member 36 to allow the elastic member 35 and rotating member 36 to be rotatably received therein.

Figure 6:
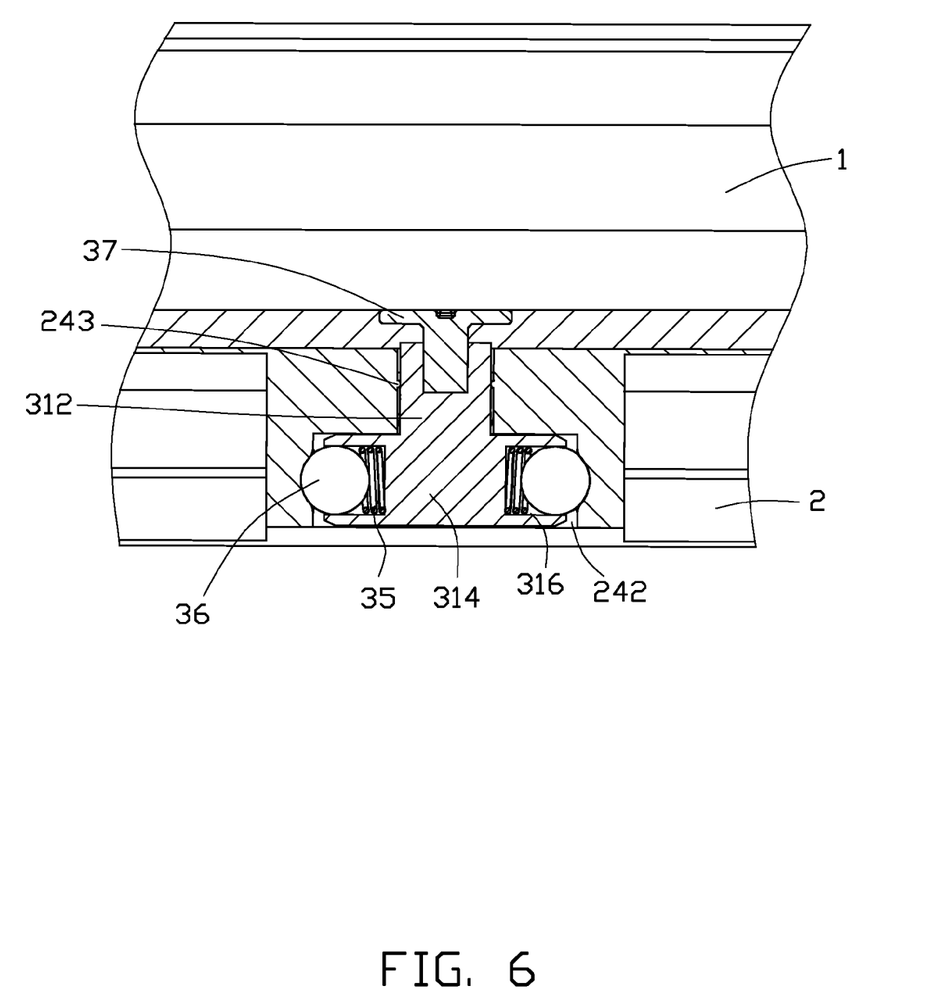
FIG. 6 is a cross section view of the electronic device of FIG. 1, taken along a line VI-VI thereof.

FIG. 6, shows the elastic member 35 and rotating member 36 orderly received in the receiving groove 316. The rotating member 36 is substantially spherically shaped. Part of the rotating member 36 is exposed from the receiving groove 316 and received in one of the limiting grooves 246. In the embodiment, the rotating member 36 is a glass ball. In other embodiments the rotating member 36 may be a ball bearing or any other ball shaped device.

The fixing portion 37 is capable of being extended through the fixing hole 102 and is further received in the blind hole 315 to fix the first portion 1 on the rotating mechanism 3. In the embodiment, the fixing portion 37 is a screw.

FIGS. 1 and 6 show in assembly, the first portion 1 is covered on the second portion 2. The first pivot body 312 is locked in one of the locking grooves 245. Part of the rotating member 36 is exposed from the receiving groove 316, and is received in one of the limiting grooves 246. The elastic member 35 received in the receiving groove 316 remains in a natural state.

Figure 7:
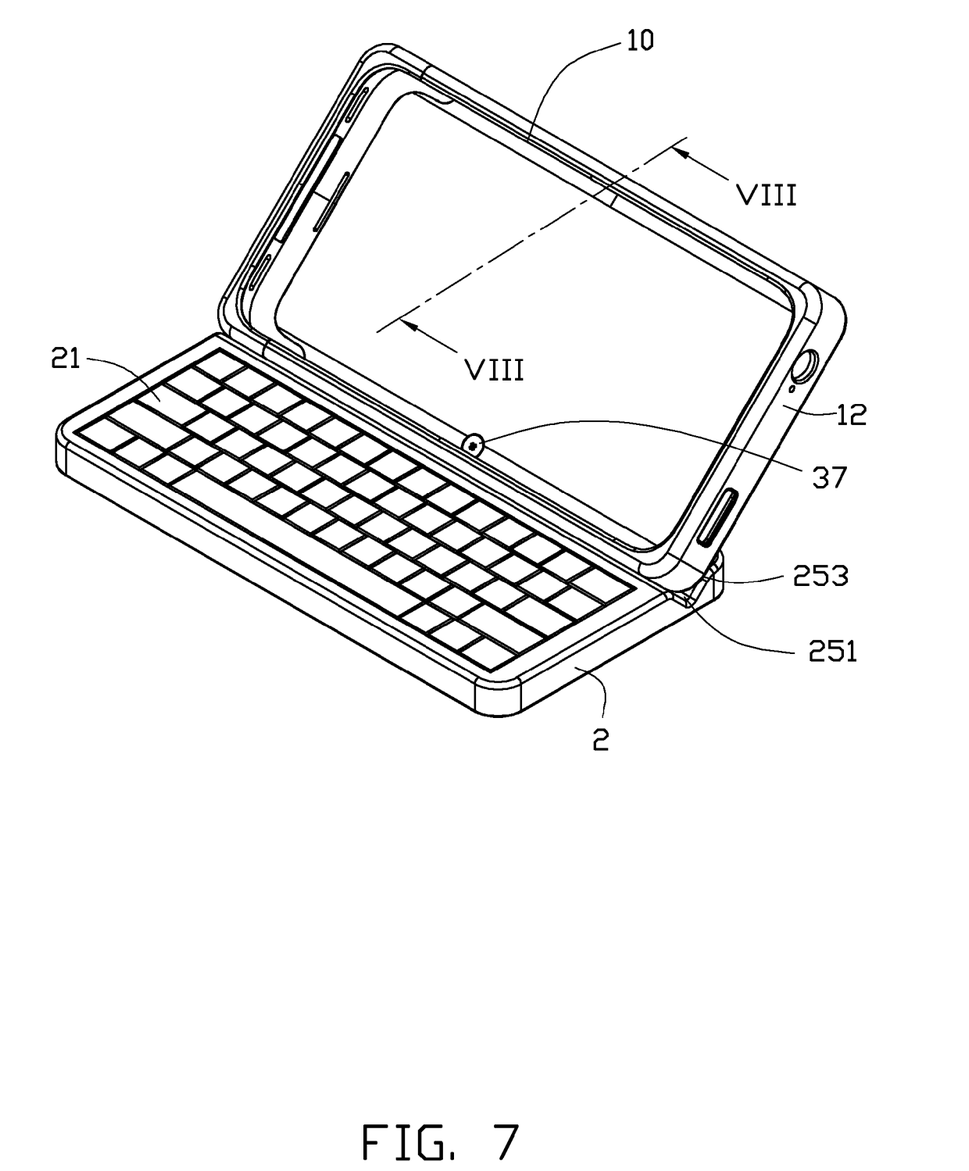
FIG. 7 is a schematic view of the electronic device of FIG. 1 being opened.
Figure 8:
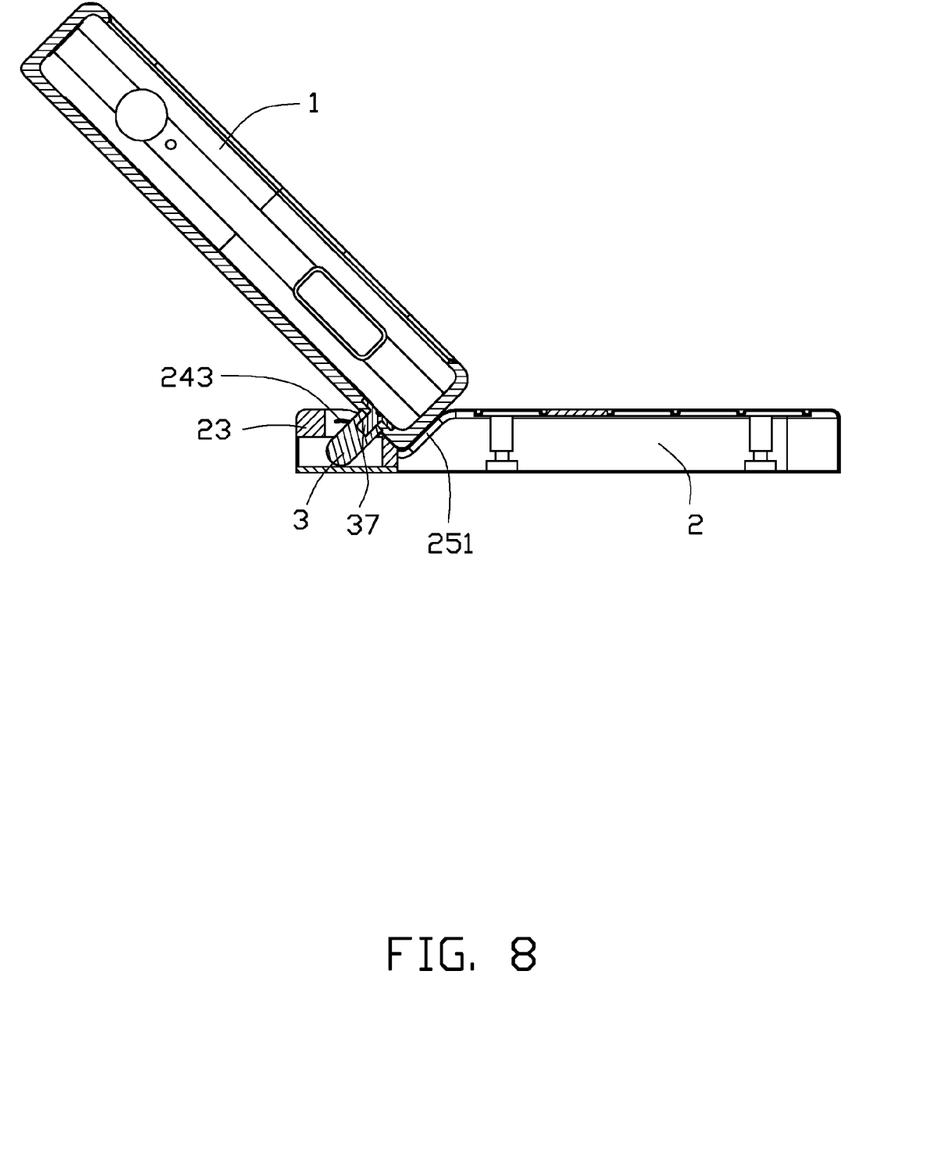
FIG. 8 is a cross section view of the electronic device of FIG. 7, taken along a line VIII-VIII thereof.

FIGS. 7-8, show in use, the first portion 1 is horizontally rotated. The rotating member 36 is rotated out of the limiting groove 246 and completely received in the receiving groove 316 as a result of the pressure of the inner sides of the limiting portion 242, the elastic member 35 is being compressed. When rotating 180 degrees, the rotating member 36 is received in the other limiting groove 246. The bottom wall 10 is supported by the supporting portion 23. Thus, the electronic device 100 is opened and the keyboard portion 21 is exposed to the user.

Furthermore, when the first portion 1 is horizontally rotated 180 degrees, an angle between the first portion 1 and the second portion 2 can be adjusted by rotating the first portion 1 along the axis of the second pivot body 314. When the first portion 1 is located in a desired angle, the pivot 31 is positioned by the locking groove 243, the side wall 12 defining the fixing hole 102 is supported by the first sloping surface 251, and the bottom wall 10 is supported by the second sloping surface 253.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. An electronic device, comprising:
a first portion;
a second portion coverable by the first portion; and
a rotating mechanism disposed in the second portion for rotatably connecting the first portion and the second portion;
wherein the first portion is rotatable relative to the second portion from a first position to a second position by rotating the first portion relative to the rotating mechanism in a first plane, in the first position the first portion covers on the second portion; in the second position a part of the second portion is exposed, and the angle between the first portion and the second portion is adjustable by rotating the first portion in a second plane perpendicular to the first plane; the rotating mechanism comprises a stepped through hole and a pivot for rotating in the stepped through hole; the pivot comprises a first pivot body and a second pivot body perpendicularly attached to the first pivot; when the first portion rotates in the first plane, the first pivot body and the second pivot body simultaneously rotate in the first plane; when the first portion rotates in the second plane to make the second portion to be partly exposed, the first pivot body and the second pivot body rotate simultaneously in the second plane to adjust the angle between the first portion and the second portion; a locking portion protrude from an inner side of the through stepped hole; the locking portion defines a plurality of locking grooves continuously arranged on a surface of the locking portion; while the first pivot body rotates in the second plane, the first pivot is blocked in different locking grooves for adjusting the angle between the first portion and the second portion; while the first pivot body rotates in the first plane, the first pivot keeps being blocked in a same locking groove.

2. The electronic device of claim 1, wherein the first portion comprises a fixing hole; the rotating mechanism further comprises a fixing portion; the fixing portion is fixed on the first pivot body through the fixing hole.

3. The electronic device of claim 1, wherein the through stepped hole comprises a limiting portion communicating with a positioning portion; the first pivot body is received in the positioning portion, and the second pivot body is received in the limiting portion.

4. The electronic device of claim 3, wherein the rotating mechanism further comprises a rotating member and an elastic member; the elastic member is received in the second pivot body; the limiting portion is annular and defines two limiting grooves; parts of the rotating member is exposed from the pivot and received in one of the limiting grooves, and parts of the rotating member are received in the second pivot body for pressing the elastic member.

5. The electronic device of claim 4, wherein the limiting groove set on the inner side of the limiting portion is hemispherical and has an axis perpendicular to the second portion.

6. The electronic device of claim 1, wherein the first portion comprises a bottom wall and four side walls extending from rims of the bottom wall; the bottom wall and the four side walls forms a receiving portion for housing another device.

7. The electronic device of claim 5, wherein the second portion comprises a slot; when the angle between the first portion and second portion is adjusted in the second plane, parts of the first portion is received in the slot; the second portion can communicate with the another device received in the first portion in a wired or wireless manner.

8. The electronic device of claim 7, wherein the second portion further comprises a keyboard portion and a supporting portion, the slot is set between the keyboard portion and the supporting portion; when rotating the first portion in the first plane, the keyboard portion is exposed to the user, and the first portion is supported by the supporting portion.

9. The electronic device of claim 1, wherein the first portion divides into a first shell and a second shell detachably sleeving on the first shell.

10. The electronic device of claim 1, wherein the first plane is parallel with the horizon.

11. A rotating mechanism for rotatably connecting a first portion with a second portion covered by the first portion, the rotating mechanism comprising:
a pivot fixed to the first portion;
an elastic member; and
a rotating member;
wherein the second portion comprises a through stepped hole; the pivot is rotatably received in the through stepped hole; the elastic member is wholly received in the pivot; the rotating member is received in the pivot and connected to the elastic member, part of the rotating member can be exposed from the pivot and received in the second portion; by rotating the pivot in a first plane, the rotating member presses the elastic member for being wholly received in the pivot, so that the second portion is partly exposed; the through stepped hole comprises a locking portion; the locking portion blocks the pivot in different positions for adjusting the angle between the first portion and the second portion in a second plane perpendicular to the first plane; the pivot is T-shaped and comprises a first pivot body and a second pivot body perpendicularly attached to the first pivot body, when the first portion rotates in the first plane to make the second portion to be partly exposed, the first pivot body and the second pivot body simultaneously rotate in the first plane; when the first portion rotates in the second plane, the first pivot and the second pivot body simultaneously rotate in the second plane for adjusting the angle between the first portion and the second portion; the elastic member is received in the second pivot body; a locking portion protrude from an inner side of the through stepped hole; the locking portion defines a plurality of locking grooves continuously arranged on a surface of the locking portion; while the first pivot body rotates in the second plane, the first pivot is blocked in different locking grooves for adjusting the angle between the first portion and the second portion; while the first pivot body rotates in the first plane, the first pivot keeps being blocked in a same locking groove.

12. The rotating mechanism of claim 11, wherein the first pivot body defines a blind hole, the first portion defines a fixing hole, and the second portion further comprises a fixing portion; the fixing portion fixed with the blind hole through the fixing hole.

13. The rotating mechanism of claim 11, wherein the through stepped hole comprises a limiting portion; the limiting portion defines two limiting grooves on the opposite inner side of the limiting portion; the exposed rotating member is received in one of the limiting grooves.

14. The rotating mechanism of claim 11, wherein the first plane is parallel with the horizon.

* * * * *